US008641805B2

(12) United States Patent
Stevens et al.

(10) Patent No.: US 8,641,805 B2
(45) Date of Patent: Feb. 4, 2014

(54) REACTOR, PLANT AND PROCESS

(75) Inventors: Geoff Stevens, Williamstown (AU);
Barry Hooper, Cheltenham (AU); Craig Dugan, Park Orchards (AU); Paul Anthony Webley, Glen Iris (AU)

(73) Assignee: CO2CRC Technologies PTY Ltd., Kensington, Western Australia (AU)

( * ) Notice: Subject to any disclaimer, the term of this patent is extended or adjusted under 35 U.S.C. 154(b) by 295 days.

(21) Appl. No.: 12/599,751

(22) PCT Filed: May 12, 2008

(86) PCT No.: PCT/AU2008/000664
§ 371 (c)(1),
(2), (4) Date: Aug. 24, 2011

(87) PCT Pub. No.: WO2008/138054
PCT Pub. Date: Nov. 20, 2008

(65) Prior Publication Data
US 2011/0296994 A1 Dec. 8, 2011

Related U.S. Application Data

(60) Provisional application No. 60/928,910, filed on May 11, 2007.

(30) Foreign Application Priority Data

May 11, 2007 (AU) ................................ 2007902503

(51) Int. Cl.
*B01D 47/00* (2006.01)
(52) U.S. Cl.
USPC ............................................. 95/236; 96/297
(58) Field of Classification Search
USPC ............. 95/236, 149; 423/228–230; 261/113, 261/152, 94, 117; 52/600, 665, 414; 428/615, 621, 626; 249/187.1; 96/290, 96/296, 297
See application file for complete search history.

(56) References Cited

U.S. PATENT DOCUMENTS 3,511,027 A * 5/1970 Rogacki et al. .................. 95/162
3,930,348 A * 1/1976 Wise ................................ 52/600
(Continued)

FOREIGN PATENT DOCUMENTS

EP 0 455 378 A1 11/1991
EP 1 690 585 A2 8/2006
(Continued)

OTHER PUBLICATIONS

European Search Report for European Patent Application No. 08747935.8 (mailed Sep. 3, 2012).
(Continued)

*Primary Examiner* — Robert A Hopkins
(74) *Attorney, Agent, or Firm* — Merchant & Gould P.C.

(57) ABSTRACT

The present invention relates to reactor vessels such as absorbing or stripping columns that are suitable for capturing carbon dioxide from flue gas streams of fossil fuel fired powered stations such as coal fired power stations generating 100 to 500 MW. The side walls of the reactors are made of concrete or structural ceramics that are preferrably steel reinforced. The reactors are on a sufficiently large scale such that a flue gas stream in the order of at least 1,000 t/hr and normally greater than 2,000 or 3,000 t/hr can be scrubbed of carbon dioxide in a single absorption column and then recovered in a stripping column. The absorbing and stripping columns may be free standing structures or, alternatively, the absorbing column may be located at least partially within the stripping column.

14 Claims, 5 Drawing Sheets

(56) References Cited

U.S. PATENT DOCUMENTS

| | | | |
|---|---|---|---|
| 5,069,830 A * | 12/1991 | Moore et al. | 261/94 |
| 5,455,013 A * | 10/1995 | Shibata et al. | 423/230 |
| 6,071,484 A | 6/2000 | Dingman, Jr. et al. | |
| 6,146,603 A | 11/2000 | Chakravarti et al. | |
| 6,274,108 B1 * | 8/2001 | Fujii et al. | 423/228 |
| 6,497,852 B2 | 12/2002 | Chakravarti et al. | |
| 2003/0049485 A1 * | 3/2003 | Brupbacher et al. | 428/615 |
| 2004/0237528 A1 * | 12/2004 | Nurmia | 60/671 |

FOREIGN PATENT DOCUMENTS

| | | |
|---|---|---|
| JP | 56-147609 | 11/1981 |
| WO | WO 2007/019632 | 2/2007 |
| WO | WO 2007/075400 | 7/2007 |

OTHER PUBLICATIONS

Laso et al. "Absorption." *Kirk-Othmer Encyclopedia of Chemical Technology* John Wiley & Sons, Inc. vol. 1. 2003 pp. 1-30.

* cited by examiner

REACTOR, PLANT AND PROCESS

This application is a National Stage Application of PCT/AU2008/000664, filed 12 May 2008, which claims benefit of Serial No. 2007902503, filed 11 May 2007 in Australia, and U.S. Application No. 60/928,910, filed 11 May 2007 and which applications are incorporated herein by reference. To the extent appropriate, a claim of priority is made to each of the above disclosed applications.

FIELD AND BACKGROUND OF THE INVENTION

The present invention relates to a reactor, plant and processes for removing carbon dioxide from industrial gas streams such as, but by no means exclusively limited to, flue gases of coal fired powered stations.

The capture and storage of carbon dioxide is a worldwide issue due to its importance in reducing greenhouse gas (GHG) emission in the context of the global climate change. It is now integral to a low emissions future for coal fired power generation. As a result, increasing resources are being dedicated to research and development in the field of $CO_2$ capture; with the major objective of reducing the cost for $CO_2$ removal. Among all the available technologies which can in principle be used for $CO_2$ capture from flue gases, absorption processes based on chemical solvents are currently the preferred option due to current widespread use and their high capture efficiency and selectivity. However, handling and removing carbon dioxide from industrial gas streams such as power plant flue gases that produce in order of 3000 t/day of carbon dioxide is a technical and economic challenge. The main reasons attributing to this are:

- technical and economic costs associated with scaling up of conventional absorber and stripper columns that are constructed of steel;
- limiting equipment parameters including column diameters, available shell and plate sizes for heat exchangers and reboilers; and
- maldistribution of fluid mediums in absorber and stripper columns.

The present invention is based on the realization that the removal of carbon dioxide from industrial gas streams can be achieved using single stream processing equipment that reduces operating and capital costs previously thought to be impractical.

SUMMARY OF THE INVENTION

According to the present invention there is provided a reactor for processing a gas phase containing carbon dioxide, the reactor including:
i) a side wall defining a chamber, the side wall being constructed from materials that include concrete or structural ceramics, the chamber containing a solid substrate that may be either one of a) an absorbing medium either as a fixed bed or a moving bed, or alternatively b) a substantially inert substrate, conventionally called packing that facilitates contact between a liquid absorbent and the gas stream,
ii) one or more beams that span across the chamber and support the solid substrate in the chamber;
iii) one or more inlets to the chamber supplying gas phase rich in carbon dioxide to the chamber; and
iv) one or more outlets to the chamber discharging gas phase lean in carbon dioxide from the reactor.

Throughout this specification, the terms "concrete or structural ceramics" includes geo-polymeric materials such as aluminosilicate materials, mineral polymers, ceramic and refractory materials, and concrete materials.

According to one embodiment, the reactor could be used for scrubbing carbon dioxide from industrial flue gases, such as the flue gas of coal fired power station. In this situation, the absorbing medium is preferably a liquid phase and the reactor contains a substrate in the form a high surface area packing to facilitate contact between the gas and liquid phases.

According to another embodiment, the reactor could be used for carrying out adsorptive separation processes such as pressure swing absorption (PSA), temperature swing absorption (TSA), or a combination of PSA and TSA, where the substrate is a solid absorbing medium and carbon dioxide is selectively adsorbed and desorbed by means of process operating conditions such as pressure and temperature. Suitably, said outlet for discharging a gas stream lean in carbon dioxide also discharges a stream rich in carbon dioxide during depressurisation of the reactor.

According to the present invention there is provided a reactor for contacting a gas phase containing carbon dioxide and a liquid absorbent for removing carbon dioxide from the gas phase, the reactor including:
i) a side wall constructed from materials that include concrete or structural ceramics, the side wall defining a chamber having upper and lower sections and a intermediate section therebetween, the intermediate section containing a substrate that provides an interface in which the gas and liquid phases contact;
ii) multiple lower inlets in the lower section supplying gas phase rich in carbon dioxide into the lower section;
iii) multiple lower outlets in the lower section located above said lower inlets, the outlets discharging liquid absorbent rich in carbon dioxide from the lower section;
iv) one or more (multiple) upper inlets in the upper section supplying said liquid absorbent lean in carbon dioxide into the upper section;
v) one or more outlets in the upper section discharging the gas phase lean in carbon dioxide from the reactor.

It will be appreciated that the reactor may be of any diameter and ultimately the gas flow rate that can be handled may be of any magnitude. However, in the situation where the reactor scrubs carbon dioxide from flue gas of a coal fired power station generating in the range of 100 to 400 MW, in an embodiment the lower inlet supplies at least 1,000 t/hr, and suitably greater than 2,000 or 3,000 t/hr of the gas. Depending on the particular application, the inlet of the reactor may also supply a gas flow rate in the range of 100 to 500 t/hr.

In an embodiment, the upper inlet supplies liquid absorbent in the form of an alkali carbonate such as 30 w/wt % potassium carbonate at an amount at least equal to 12,000 t/hr and suitably greater than 15,000 t/hr. The absorbing medium may also be in the form of other alkali carbonates such as sodium carbonate or other species such as amino acids or a range of amines such as monoethanolamine (MEA). The absorbing medium may also include one or more activators or promoters.

In an embodiment, the lower outlets discharging liquid absorbent rich in carbon dioxide are located at a spacing between a central point and the side wall of the chamber. Suitably, the spacing is such that the lower outlets are located approximately at a mid point between the central point and the side wall of the chamber. One of the lower outlets may also be located substantially at the central point of the chamber.

In an embodiment, the lower inlets that supply the gas phase rich in carbon dioxide and are distributed or evenly distributed about the perimeter of the chamber.

In an embodiment, the lower outlets of the lower section are located below the lower inlets.

In an embodiment, the upper inlets supplying liquid absorbent lean in carbon dioxide into the chamber at locations distributed about or evenly distributed about the perimeter of the chamber.

According to the present invention there is also provided a reactor for volatilizing carbon dioxide from a liquid absorbent rich in carbon dioxide, the reactor including:
  i) a side wall constructed from materials that include concrete or structural ceramics, the side wall defining a chamber having upper and lower sections and an intermediate section therebetween, the intermediate section containing a substrate that provides an interface to facilitate the separation of carbon dioxide from the liquid absorbent;
  ii) one or more (multiple) upper inlets in the upper section supplying liquid absorbent rich in carbon dioxide into the upper section;
  iii) multiple lower outlets in the lower section discharging the liquid absorbent lean in carbon dioxide from the lower section;
  iv) one or more (multiple) upper outlets in the upper section discharging a gas product rich in carbon dioxide; and
  v) multiple tubes located in the lower section through which a hot medium passes and thereby heats the liquid absorbent in the lower section.

In an embodiment, the upper inlet supplies at least 12,000 t/hr and suitably greater than 15,000 t/hr of liquid absorbent.

The reactors described above may also include one or more beams located at the junction between the intermediate section and the lower section, the beams spanning across the chamber and supporting the substrate in the intermediate section;

The side walls of the reactor may be constructed using any technique. One technique of particular interest involves falsework scaffolding whereby falsework is assembled in one or more stages to define the side wall and steel reinforcement, typically ribbed bar is assembled within the boundaries of the wall and pre-welded if necessary. A concrete mix is then poured into the falsework which is removed once the wall becomes self-supporting. Once constructed the surfaces of the wall are solely or predominately concrete.

Although it is possible that the reactor may have any geometric cross section including rectangular, square and circular shapes, preferably the reactor has an internal dimension, diameter, or width of at least 5 meters and even more preferably at least 8 or 12 meters and suitably at least 20 or 25 meters. In other words, the side wall of the reactor may have a rectangular, square, circular, elliptic or any other cross-section. In any event, it will be appreciated that the dimensions of the reactor are ultimately a function of the flow rate of the gas phase to be handled and, therefore, the reactor may have any internal cross-section or diameter and is not specifically limited to the values mentioned above.

In the situation where the reactor has a cylindrical chamber and receives either one or a combination of flue gas of a power station and a liquid absorbent for removing carbon dioxide from the flue gas, the reactor preferably has an internal diameter greater than 12 m, and suitably 18 m and a height of at least 20 m and suitably 28-30 m.

In an embodiment, the loads from the beam(s) spanning between the side wall are bearing on the side wall.

In an embodiment, the lower outlets discharging the liquid absorbent lean in carbon dioxide are located at a spacing between a central point of the chamber and the side wall. Suitably, the spacing is such that the lower outlets are located approximately at a mid point between the central point and the side wall. One of the lower outlets may also be located substantially at the central axis of the chamber.

In an embodiment, the upper inlets supplying liquid absorbent rich in carbon dioxide and are distributed or evenly distributed about the perimeter of the chamber.

In an embodiment, the upper outlets discharging gas rich in carbon dioxide are located at a spacing between a central axis of the chamber and the side wall. Suitably, the spacing is such that the lower outlets are located approximately at a mid point between the central axis and the side wall. One of the lower outlets may also be located substantially at the central point of the chamber.

According to the present invention there is also provided a reactor including:
  first and second chambers, wherein the first chamber is defined by an inner wall formation and the second chamber is entirely or at least in part defined by spacing between the inner wall formation and an outer wall formation arranged about or around the inner wall formation, said inner and outer walls being constructed from materials that include concrete or structural ceramics,
  wherein the first chamber includes an upper inlet supplying a liquid absorbent rich in carbon dioxide to an upper section of the first chamber, an upper outlet discharging gas phase highly concentrated in carbon dioxide from the first chamber, a lower outlet discharging the liquid absorbent lean in carbon dioxide from a lower region of the first chamber;
  and wherein the second chamber includes an upper inlet supplying liquid absorbent lean in carbon dioxide to an upper section of the second chamber, the upper inlet is flow connected to the lower outlet of the first chamber, a lower inlet supplying gas phase rich in carbon dioxide to a lower section of the second chamber, a lower outlet discharging liquid absorbent that is rich in carbon dioxide from the second chamber and is flow connected to the upper inlet of the first chamber, and an outlet discharging a stream of gas lean in carbon dioxide.

In other words, the gas phase is scrubbed of carbon dioxide by the liquid absorbent in the second chamber and vented to the atmosphere, and carbon dioxide is stripped from the liquid absorbent in the first chamber to produce a gas stream rich in carbon dioxide. The gas stream highly concentrated in carbon dioxide can thereafter be stored as desired to prevent emission to the atmosphere.

In an embodiment, the outlet discharging a stream lean in carbon dioxide is an opening at the upper end of the second chamber.

In an embodiment, the first chamber further includes a heating means or heater that transfers heat to the liquid absorbent and thereby volatilise carbon dioxide therefrom.

In an embodiment, the heater is in the form of multiple tubes arranged in the lower region of the first chamber through which a hot stream passes. The heater may be in the form of multiple tubes through which a heating medium is conveyed.

In an embodiment the lower section of the first chamber protrudes from the lower section of the second chamber and the tubes of the heater pass directly into the lower section of the first chamber. In the situation where the lower section of the first chamber is contained within the second chamber, it is necessary for the tubes to some extent pass through the second chamber before entering the first chamber.

As described above, the reactor of the present invention is capable of handling any gas and liquid flow rates. As a result, the cross-sectional areas of the first and second chambers will ultimately be a function of the flow rate of the gas to be treated, the flow rate of the liquid absorbent and the desired velocity of the fluids in the chambers. However, in the situation where the reactor scrubs flue gas of the coal fired power station generating in the range of 100 to 400 MW, in an embodiment the lower inlet of the second chamber supplies at least 1,000 t/hr, and suitably greater than 2,500 or 3,000 t/hr of flue gas containing carbon dioxide.

In an embodiment, the upper inlet of the second chamber supplies liquid absorbent in the form of an alkali carbonate such as a 30 w/wt % potassium or sodium carbonate solvent that may or may not include activators or promotes at an amount suitably at least 12,000 and even more suitably at least 15,000 t/hr of liquid. Moreover, the absorbing medium may be in the form of other alkali carbonate, amino acids or a range of amines as described above.

In an embodiment, the upper inlet of the first chamber supplies at least 12,000 and suitably at least 15,000 t/hr of liquid solution to the second chamber.

In an embodiment, the first chamber has an internal diameter or width of at least 5 meters (m), suitably a diameter or width of at least 8 or 12 m and even more suitably a diameter or width of at least 20 or 25 m. The first chamber may have any height and is suitably greater than 12, and suitably 18 m and have a height of at least 20 m and may, for example, have a height in range of 28 to 30 m.

The second chamber suitably has an outer width or diameter of at least 15 m, and suitably a diameter or width of at least 30, 40 or 50 m. An inner width or diameter of the chamber is determined by the outside width of the first chamber and may be at least 5 m and may typically be in the range of 8 to 25 m.

According to the present invention there is also provided a fossil fuel fired power station producing at least 1,000 t/hr and suitably at least 2,000 or 2,500 t/hr of the flue gas, the power station including any one of the reactors described above for removing carbon dioxide from the flue gas or for volatizing carbon dioxide from an liquid phase.

According to the present invention there is also provided a process of scrubbing carbon dioxide from a gas stream, the process including the steps of:

a) conveying at least 100 t/hr and suitably at least 1,000 or 2,000 t/hr of gas containing carbon dioxide through a single absorber reactor in which the gas stream contacts a liquid absorbent so as to transfer carbon dioxide to the liquid absorbent;

b) discharging liquid absorbent rich in carbon dioxide from the absorber reactor and feeding the rich liquid absorbent to a stripper reactor;

c) volatilising carbon dioxide from the liquid absorbent in the stripper; and d) discharging liquid absorbent lean in carbon dioxide from the stripper and recycling the lean liquid absorbent back to the absorber reactor.

In an embodiment step a) involves conveying at least 2,500 t/hr of gas through the absorber reactor. Although it is possible that a stream of gas in the order of 3, 4 or 5 thousand t/hr can be scrubbed in a single absorber reactor, in the situation where the amount of the gas to be scrubbed exceeds 4,000 t/hr, suitably step a) involves splitting the gas and conveying the gas through two separate absorber reactors. The option of splitting the gas into multiple streams and thereafter treating the streams in parallel absorbers is dependent on a number of considerations including plant redundancy, available site space, sizes of available supporting equipment such as piping, and desired reactor cross-sections. A predominant consideration is also the ability to physically and economically build large vessels.

In the situation where the liquid absorbent is in the form of an alkali carbonate such as a 30 w/wt % potassium or sodium carbonate solvent, the solvent that may or may not include activators or promotes. Suitably, at least 6,000 t/hr of liquid absorbent is fed to the absorber reactor.

The process may also involve discharging a gas product stream rich in carbon dioxide whereby the flow rate of carbon dioxide in the product stream is at least 100 and suitably 200, 400 or 500 t/hr.

Step d) may involve feeding 15,000 t/hr of a potassium carbonate liquid absorbent having a concentration of 30 wt-%.

BRIEF DESCRIPTION OF THE DRAWINGS

The present invention will now be described in detail with reference to the accompanying drawings, of which.

DETAILED DESCRIPTION

The embodiments of the invention shown in the Figures will now be described in the context of removing carbon dioxide from coal fired power station flue gas streams. However, it will be appreciated that the principles of the present invention may equally apply to any type of industrial gas stream include all types of flues gases and synthesis gas streams such as those formed during coal gasification and other pre-combustion gas streams. Generally speaking, other than coal fired power stations, the present invention may also have application in natural gas fired power stations and other chemical and petroleum industries.

The flue gas flow rate of a 500 MW a power station is typically large and in the range of 2,000 to 3,000 t/hr, and a typical composition breakdown of the flue gas is as follows:

| Species | Mass Fraction |
|---|---|
| $H_2O$ | 0.06900 |
| $CO_2$ | 0.2227 |
| $N_2$ | 0.7083 |

An example of a suitable liquid absorbent is unpromoted potassium carbonate at a content of 30 w/w % with a lean loading ~0.225 ([HCO3-]/[K+]) would be used in absorber and stripper columns. The required mass flow rate of liquid absorbent to scrub the flue gas of a 500 MW a power station is in the order of 15,000 to 16,000 t/hr.

Handling a flue gas and absorbent liquid at the required flow rates has in the past only been feasible on an economic basis by splitting the gas stream into multiple streams and passing each stream through dedicated absorber-stripper columns. A 500 MW black coal power plant is considered to need a minimum of 2 trains which means 2 absorbers and one or two strippers. As flue gases are usually associated with corrosive impurities ($O_2$, SOx, NOx, ... ), and also due to the corrosive nature of solvents, the materials of construction may have to be corrosive resistant metals, such as high quality steels, but in either case will be very costly.

The base case of adopting a single processing stream has been considered impractical due to construction methods using conventional materials, like metals. Often factors such as the maximum size of auxiliary equipment such as the reboiler for the stripper column have also come into consideration. The multiple streams option is more expensive not only due to a large number of units required, but also due to the complexity of operation and design.

Contrary to conventional practices we have found that handling the flue gas of a power station via a single stream flow sheet can be achieved on a scale previously thought impractical. Specifically, in order to handle flue gas flow rates in the order of at least 1,000 and suitably greater than 2,000 or 3,000 t/hr, oversized absorber-stripper columns 10 and 12 have been devised. The columns are suitably constructed from concrete, or steel reinforced concrete, and can be made with diameters in excess of 5 meters and suitably in excess of 10, 15, 20 or 25 meters and thereby far exceeding the current conventional maximum diameter of approximately 12 meters for columns constructed of steel. The steel reinforcement may be any reinforcement such as I or H beams and may also be conventional rod or bar having exterior ribs. The conventional rod or bar may be pre-fabricated or welded into desired formations. The walls may be built using conventional scaffolding and falsework techniques. It will be understood that the term falsework covers any temporary wooden or metal framework built to support the structure under construction until that structure is self-supporting.

Figure 1:
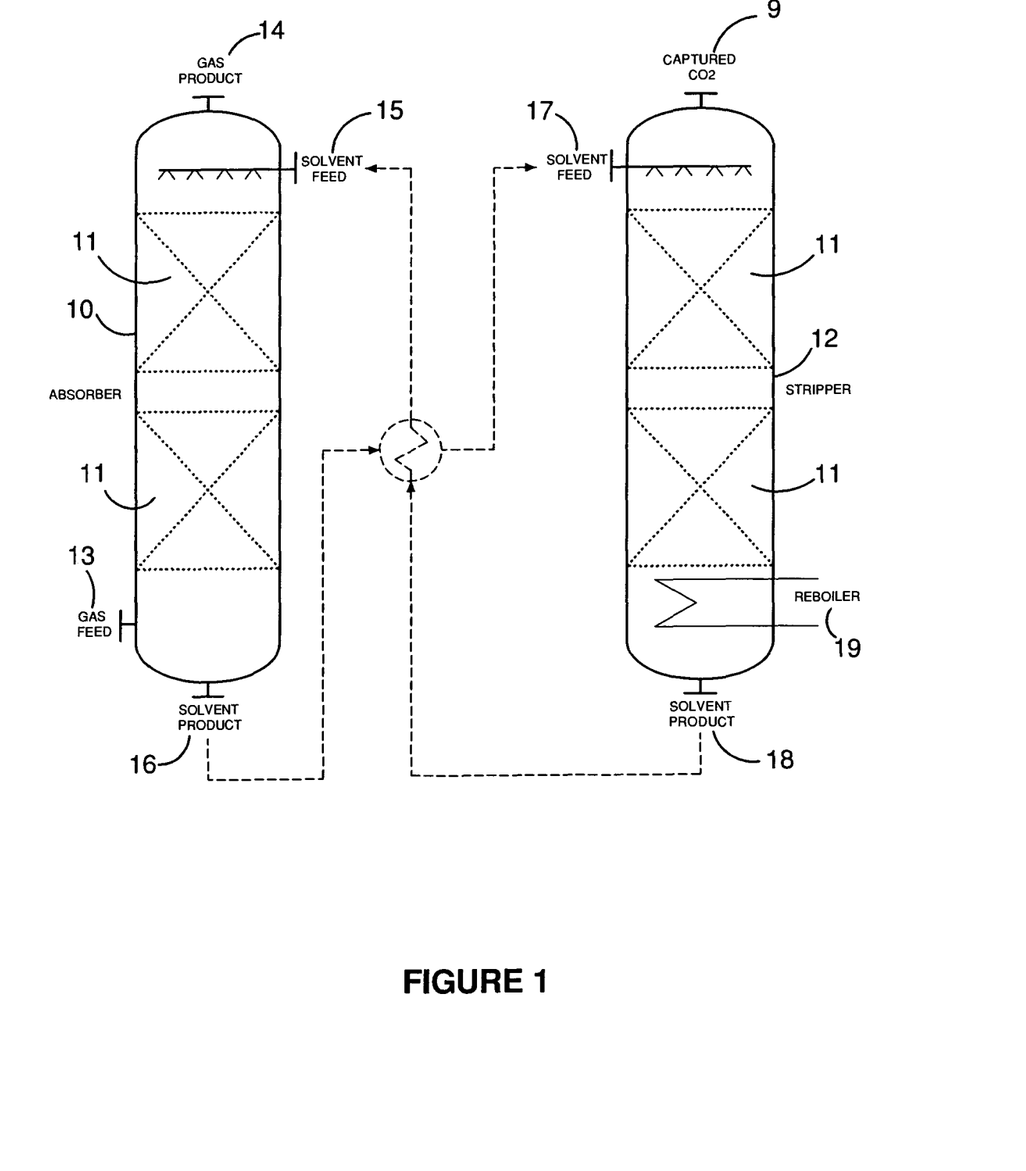
FIG. 1 is a diagram illustrating separate reactors in the form of absorber and stripper columns according to a first embodiment of the present invention.

With reference to the drawings, FIG. 1 comprises two separate reactors, the first reactor is in the form of an absorber column 10 containing a high specific surface area packing 11 and though which gas and liquid absorbent streams pass in opposite directions. A high volume gas stream 13 that is rich in carbon dioxide is fed to the bottom of the absorber column 10 and a gas product stream 14, lean in carbon dioxide is discharged from the top of the column 10. Liquid absorbent 15 lean in carbon dioxide, and preferably in the form of an alkali passes from the top to bottom of the column 10 in counter current to the gas stream and is discharged from the bottom of the column rich in carbon dioxide 16. The rich-absorbent is then passed to the stripper column 12 in which carbon dioxide is volatilized from the absorbent. A gas stream 9 rich in carbon dioxide is discharged from the top of the stripper 12 and a lean absorbent 18 is discharged from the bottom of the column 12. The stripper column 12 contains packing 11 and reboiler 19 for heating the absorbent. The lean absorbent is recycled back to the absorber column 10.

The stripper column 12 can also include a re-boiler 19 integrally formed in the lower section in the form of a set of tubes that convey a heating medium, typically steam. One of the advantages of this type of structure is that the costs associated with the producing the shell and plates at opposite ends of a conventional heat exchanger are avoided.

Figure 2:
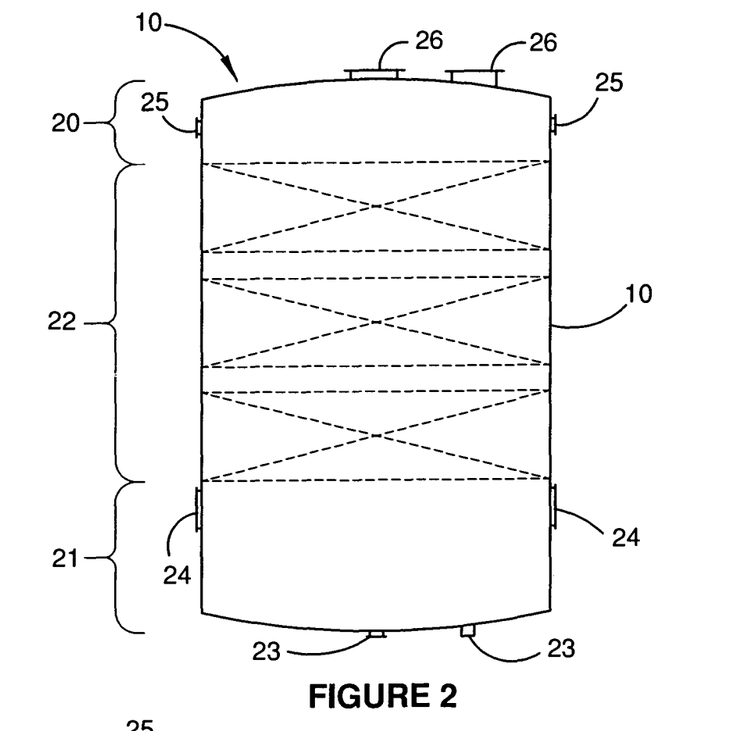
FIG. 2 is a side view of the absorber column shown in FIG. 1 on which the dimensions of key components of the column have been shown in meters.

FIG. 2 is a side view of the absorber column 10 on which the dimensions of inlets, outlets and packing sections have been provided. As can be seen the absorber column 10 is a cylindrical reactor having an internal diameter of approximately 20 meters and an internal height of approximately 31 meters. The reactor defines a chamber comprising an upper section 20, and lower section 21 and an intermediate section 22. The intermediate section 22 comprises three packed sub-sections that contain a high specific surface area to facilitate absorption of carbon dioxide from the flue gas to the liquid absorbent. The packed sub-sections are approximately 5 meters in height and are separated at 1.5 m spacing to allow man-hole access. It is estimated that each sub-section contains 1281 tonnes of packing and during operation, approximately 269 tonnes of liquid absorbent.

Figure 3:
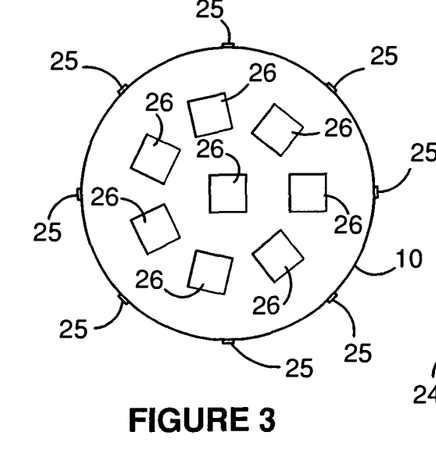
FIGS. 3 and 4 are a top and bottom views respectively of the absorber column shown in FIGS. 1 and 2.
Figure 4:
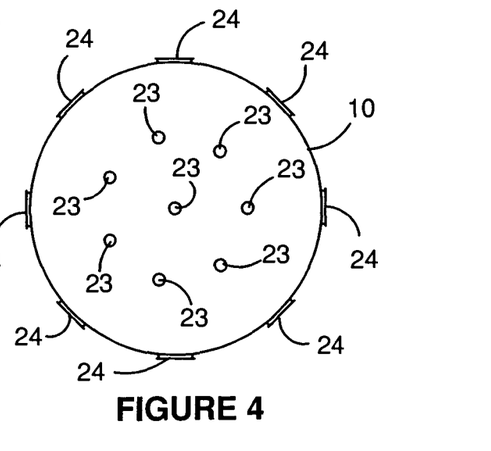

FIGS. 3 and 4 are top and bottom views respectively of the absorber column 10 and in particular, illustrate the arrangement of inlets and outlets. In the case of FIG. 4, the lower section 21 of the absorber column comprises 8 drainage points or outlets 23 that discharge liquid absorbent rich in carbon dioxide. Seven outlets are distributed half way between the side walls of the column and the centre of the column and an eight outlet is centrally located. The bottom of the column may have a curved profile such as the profile of a conventional dished end, or alternatively a flat profile. Each outlet 23 is approximately 0.75 m in diameter. The lower section 21 also comprises 8 flue gas inlets 24 distributed evenly distributed around the side walls of the column 10 approximately 1 meter below the lowest packing sub-section. The purpose of the gas inlets 24 is to evenly supply flue gas to the lower section 21 of the column 10 and thereby avoid the uneven gas pressures which could lead to channelling. The gas inlets 24 are square shaped and measure in the range of 2.2 to 2.5 m in width.

The upper section of the column comprises 8 inlets 25 that supply liquid absorbent lean in carbon dioxide to the upper section 20. The inlets 25 are evenly distributed around the perimeter of the column 10 and are approximately 0.75 m in diameter. The upper face of the column comprises 8 outlets 26 discharging a gas stream lean in carbon dioxide for venting to the atmosphere. The outlets 26 have a width of approximately 2.5 m.

Figure 5:
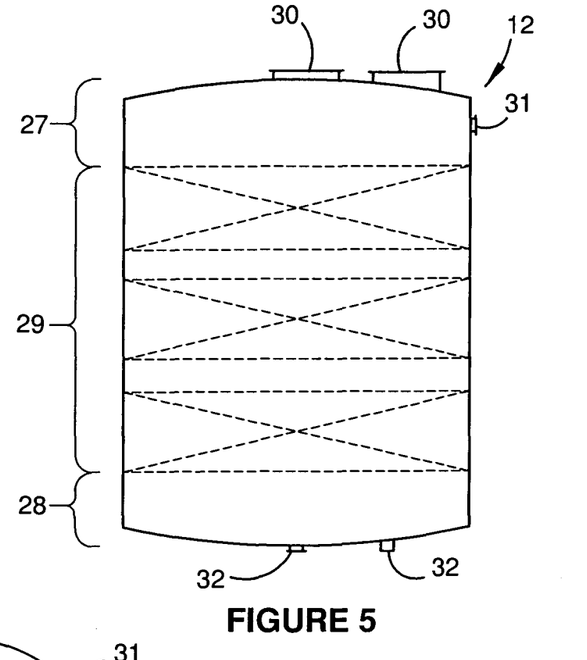
FIG. 5 is a side view of the stripper column shown in FIG. 1 on which the dimensions of key components of the column have been shown in meters.

FIG. 5 is a side view of a stripper column 12 on which the dimensions of inlets, outlets and packing sections have been provided. As can be seen the stripper column 12 is a cylindrical reactor having an internal diameter of approximately 17 m and an internal height of approximately 24 m. The reactor defines a chamber comprising an upper section 27, a lower section 28 and an intermediate section 29. The intermediate section 29 comprises three packed sub-sections, each separated by 1.5 m spacings to allow man-hole access. The packed sub-sections are approximately 4.25 m in height and it is estimated that each section contains 812 tonnes of packing and during operation, each sub-sections contains approximately 170 tonnes of liquid absorbent. Details of the reboiler tubes are not shown in FIG. 5.

Figure 6:
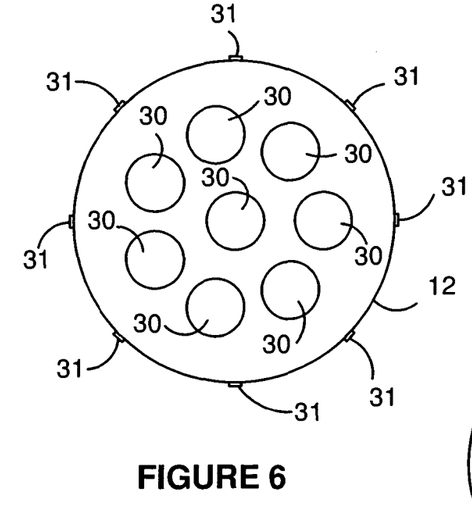
FIGS. 6 and 7 are a top and bottom views respectively of the stripper column shown in FIGS. 1 and 5.
Figure 7:
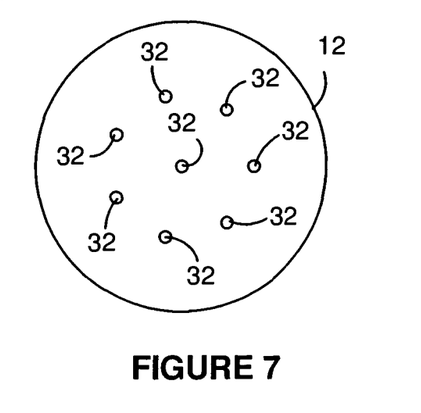

FIGS. 6 and 7 are top and bottom views respectively of the stripper column 12 and in particular, illustrate the arrangement of inlets and outlets. In the case of FIG. 6, the upper section 27 of the stripper column 12 comprises eight outlets 30 that discharge a product gas stream rich in carbon dioxide ready for storage. Each outlet 30 is approximately 3.6 m in diameter and can be vented directly to the atmosphere. Seven inlets 31 are evenly distributed around the perimeter of the side walls column 12 and feed liquid absorbent rich in carbon dioxide to the upper section 27 of the column 12. Each inlet 31 is approximately 0.75 m in diameter.

The lower section 28 of the column 12 comprises eight outlets 32 that discharge liquid absorbent lean in carbon dioxide which is then fed to the upper section of the absorber. Seven outlets are distributed half way between the side walls of the column 12 and the centre of the column 12 and an eight outlet is centrally located.

Although not shown in the Figures, internal distribution mechanisms such as pipes, baffles and other structures may also be used to aid distribution and prevent channelling and pooling of the fluids in the columns 10 and 12.

Ideally the stripper 12 is fitted with a vacuum pump such that during operation pressure in the upper section 27 of the stripper 12 may range from 0.3 to 0.5 bar absolute and from 0.5 to 1.0 bar absolute in the lower section 28 of the column 12.

Although not shown in FIGS. 1 to 7, the absorber 10 and stripper 12 columns include internal concrete beams that are preferably steel reinforced, to support the packing and absorbent liquid. The beams are arranged in an appropriate manner to support a plate which in turn supports the packing in the columns. The concrete beams are directly supported by side walls of the columns that are constructed from concrete or steel reinforced concrete. It is also envisaged that the absorber and stripper columns 10 and 12 may be mounted on concrete pillars that support the columns 2 to 3 meters above the ground which enables auxiliary equipment to be assembled under the columns as desired.

Advantages provided by the present invention include:
the costs of constructing columns of concrete rather than conventional steel structures is estimated as being a total cost reduction of approximately 35%;
transportation of construction materials would be easier compared to those for metal made reactors;
concrete side walls provide significant thermal insulation which is in turn minimizes incidental heat loss which may be reflected in operating costs reductions;
concrete columns can be operated under partial vacuum conditions in the same manner as convention steel reactors; and
heating tubes in the lower section of the stripper column provides plant layout benefits and additionally avoids costs attributable to shell and tube plates of reboiler heat exchangers.

In addition, the absorber and stripper columns 10 and 12 can be made corrosion resistant using internal linings such as but by no means limited to coating the internal surfaces with a polyester paint or another coating equivalent including polygenic sheet material.

Figure 8:
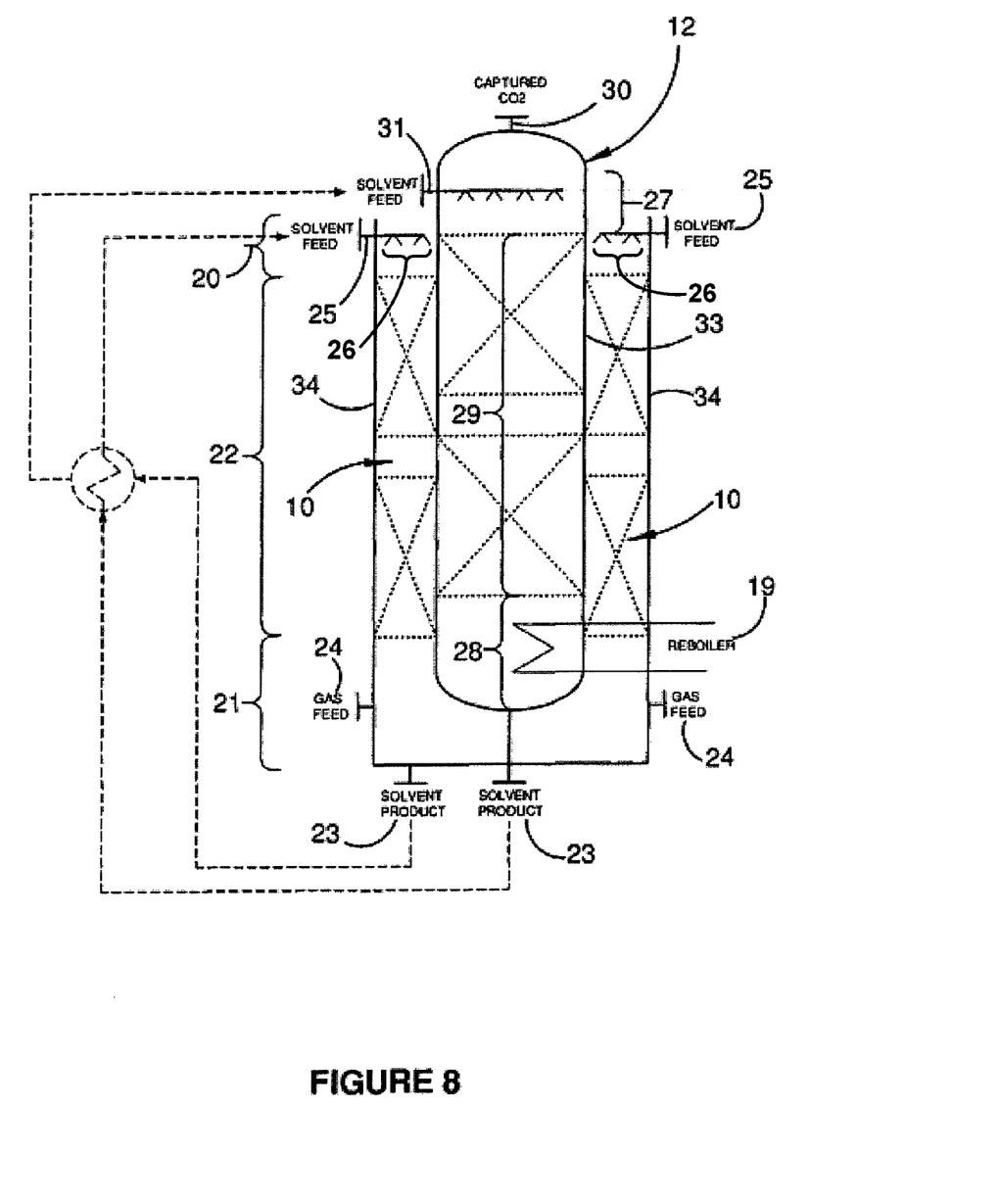
FIG. 8 is a diagram illustrating a reactor in which a stripping column is located concentrically inside an absorber column according to an alternative embodiment of the present invention.
Figure 9:
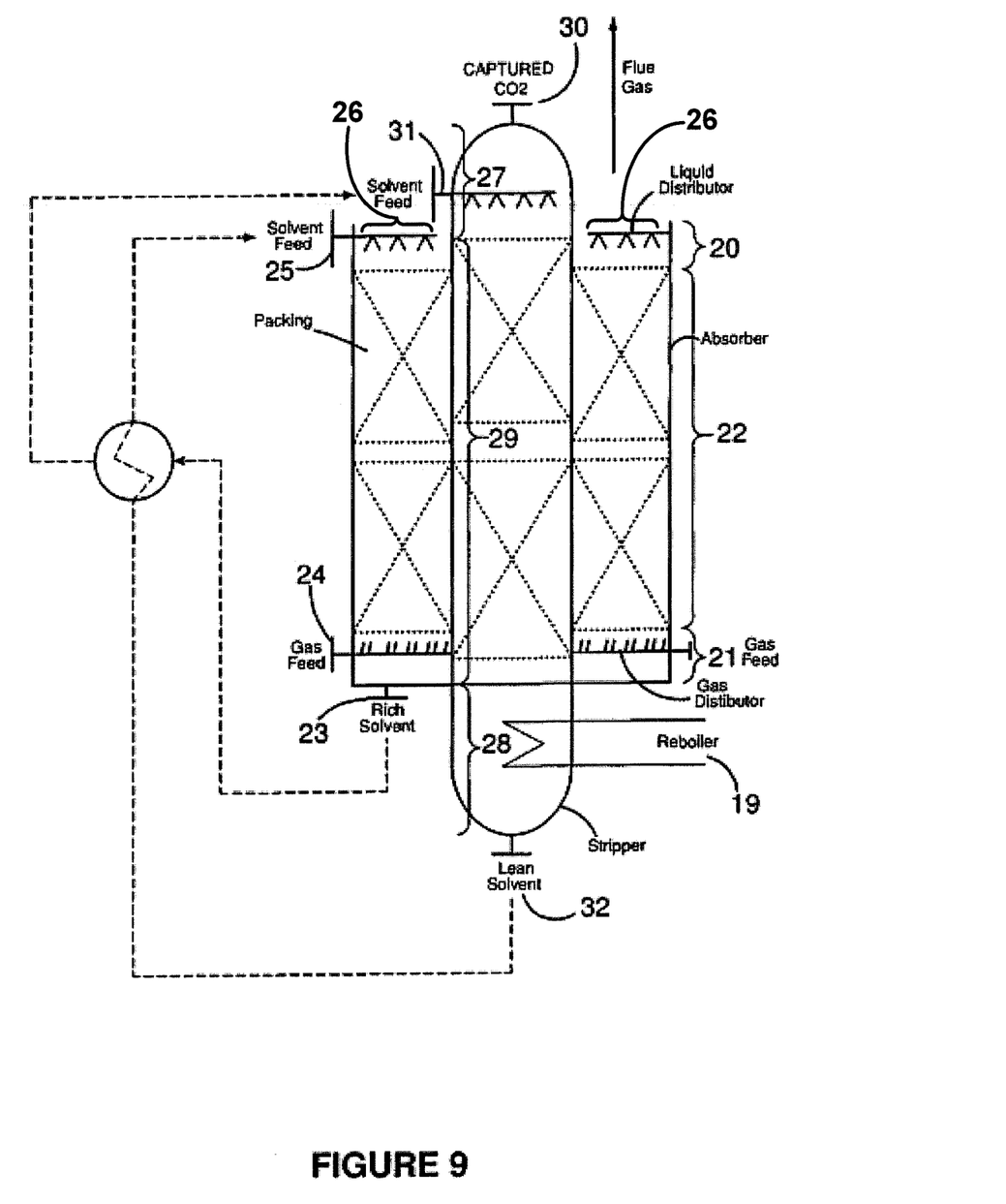
FIG. 9 is a diagram illustrating a reactor in which a stripping column is located concentrically inside an absorber column according to yet another alternative embodiment of the present invention.

FIGS. 8 and 9 illustrate two embodiments of an reactor comprising a stripper column 12 that is concentrically arranged inside the absorber column 10. A number of elements of the reactors shown in FIGS. 8 and 9 are substantially the same as the elements of the reactor shown in the FIGS. 1 to 7 and as a matter of convenience the same reference numerals have been used in the FIGS. 8 and 9 to identify the same or similar features.

The reactors shown in the FIGS. 8 and 9 include an inner wall 33 assembly that defines a cylindrical chamber comprising upper 27, lower 28 and intermediate 29 sections of the stripper column 12 as described above. The upper section 27 includes inlets 31 that supply liquid absorbent rich in carbon dioxide and outlets 30 for a product gas stream rich in carbon dioxide. The lower section 28 also includes outlets 32 as described above in relation to FIGS. 5 to 7 that discharge liquid absorbent lean in carbon dioxide that is returned to the absorber column 10. Similarly, a reboiler 19 comprising tubes is located in the lower section 28 and packing is located in the intermediate section 29. If required, the stripper 12 can be operated at sub-atmospheric pressure to facilitate volatilization of the carbon dioxide from the absorbent.

Located around the stripper column 12 is an outer wall 34 that defines an annular space between the inner and outer walls 33 and 34 and forms the absorber column 10. Similar to the absorber column 10 described in relation to FIGS. 2 to 4, the absorber column 10 includes upper 20, lower 21 and intermediate 22 sections that includes inlets, outlets and packing that facilitate the transfer of the carbon dioxide from the flue gas to the liquid absorbent. In particular, the upper section 20 includes inlets 25 that supply lean absorbent and the lower section 21 includes inlets 24 that supply flue gas rich in carbon dioxide and outlets 23 discharging rich absorbent. The internal diameter of the stripper 12 is in the order 17 m and although dependent on the thickness of the inner wall, the internal diameter of the outer wall 34 defining the absorber 10 is in the order of 30 to 40 m.

The material of construction of both the inner and outer walls 33 and 34 which together define the absorber and stripper columns 10 and 12 respectfully is preferably concrete or a steel reinforced concrete. It is intended that the stripper and absorber columns be constructed of concrete materials that are sufficiently resistant to the corrosiveness of the gas and liquid streams. However if necessary, the corrosion resistance of the inside of the columns may be improved or increased by coating the inside of the columns with a polyester paint or any other lining material such as plastic or other polymeric materials. In addition, in the situation where the columns 10 and 12 are operated at a pressure differential to atmospheric pressure, the lining or paint may also help seal the columns 10 and 12 from the atmosphere.

As can be seen in FIGS. 8 and 9, the upper section of the absorber column 10 may be open so that flue gas lean in carbon dioxide is vented directly to the atmosphere via outlet 26.

The primary difference between the reactor shown in FIGS. 8 and 9 is that the lower section 28 of the stripper 12 shown in the embodiment of FIG. 9 projects below the lower section 21 of the absorber column 10. The advantage provided by this configuration is that the tubes of the reboiler 19 of the stripper column 12 do not extend through the lower section 28 of the absorber column 12 as is the case of the embodiment shown in the FIG. 8.

The concentric apparatus shown in FIGS. 8 and 9 provide a number of significant advantages in addition to the advantages previously mentioned above over multiple pairs of conventional steel absorber and stripper columns. Examples of the additional advantages of the concentric apparatus are as follows:
construction costs are further reduced by approximately 45% less than that for two conventional metal columns;
the concentric apparatus requires significantly less land or plot space which may be a vital consideration when retrofitting the apparatus to existing power stations;
the concentric apparatus provides further minimizes the potential for heat loss;
gas and liquid distribution in large absorbers can be enhance through utilizing the annulus for absorption, thus aiding gas distribution; and
heating tubes located in the lower section of the first chamber provides plant layout benefits and additionally avoids the cost associated with shells and tube plates of conventional free standing reboilers.

Those skilled in the art of the present invention will appreciate that many modifications and variations may be made to the embodiments of the invention described above without departing from the spirit and scope of the present invention.

For example, in the situation where the quantity of the flue gas to be scrubbed using the absorber and stripper columns as described exceeds 3,000 t/hr, it is possible that the multiple absorber columns having a diameter in excess of 5 or more meters may be paired with a single stripper column.

According to another example, it is also possible that the absorbing and stripping columns of a concentric arrangement may be constructed in a reverse formation to that shown in the Figures. Specifically, the absorber may be defined by an inner wall assembly and the stripper defined by an annular space between the inner wall assembly and an outer wall assembly.

The claims defining the invention are as follows:

1. A reactor including:
    first and second chambers, wherein the first chamber is defined by an inner wall formation and the second chamber is entirely or at least in part defined by an annular spacing between the inner wall formation and an outer wall formation arranged about or around the inner wall formation, the inner wall formation and the outer wall formation being concentrically arranged and said inner and outer walls are constructed from concrete or structural ceramics,
    wherein the first chamber includes an upper inlet supplying a liquid absorbent rich in carbon dioxide to an upper section of the first chamber, an upper outlet discharging gas phase highly concentrated in carbon dioxide from the first chamber, a lower outlet discharging the liquid absorbent lean in carbon dioxide from a lower region of the first chamber;
    wherein the second chamber includes an upper inlet supplying liquid absorbent lean in carbon dioxide to an upper section of the second chamber, the upper inlet being flow connected to the lower outlet of the first chamber, a lower inlet supplying gas phase rich in carbon dioxide to a lower section of the second chamber, a lower outlet discharging liquid absorbent that is rich in carbon dioxide from the second chamber and is flow connected to the upper inlet of the first chamber, and an outlet discharging a stream of gas lean in carbon dioxide;
    and wherein the inner and outer walls are constructed by assembling falsework that forms boundaries defining the inner and outer walls, and concrete or structural ceramic is poured into the falsework to form the wall.

2. The reactor according to claim 1, wherein the first chamber further includes a heater including multiple tubes located in a cavity at the base of the first chamber to transfer heat to the liquid absorbent and thereby volatilise carbon dioxide therefrom.

3. The reactor according to claim 1, wherein steel reinforcement is assembled within the boundary defined by the falsework which is encased in the concrete or structural ceramic poured into the falsework.

4. The reactor according to claim 2, wherein the first chamber protrudes from the lower section of the second chamber and the tubes of the heater pass directly into the lower section of the first chamber.

5. The reactor according to claim 2, wherein the lower section of the first chamber is contained within the second chamber and the tubes of the heater pass into the lower section of the first chamber via the second chamber.

6. The reactor according to claim 1, wherein the lower inlet supplies at least 1,000 t/hr of a flue gas containing carbon dioxide to the second chamber.

7. The reactor according to claim 1, wherein the upper inlet supplies liquid absorbent in the form of an alkali carbonate at an amount of at least 12,000 t/hr of liquid to the second chamber.

8. A method of constructing the reactor according to claim 1, wherein the method includes:
    a) assembling falsework that defines boundaries of the side walls;
    b) pouring concrete or structural ceramic into the falsework to form the side wall; and
    c) removing the falsework once the side wall is self-supporting.

9. The method according to claim 8 including assembling steel reinforcement within the boundaries of the side walls defined by the falsework such that the steel reinforcing is encased in the concrete or structural ceramic poured into the falsework.

10. The reactor according to claim 1 wherein the side wall defining the chamber includes a top and bottom constructed of the concrete or structural ceramics with internal steel reinforcing.

11. The reactor according to claim 1, wherein the inner wall formation of the first chamber has an internal cross-section of at least 8 m and an outer wall of the second chamber has an outer width of at least 15 m.

12. The reactor according to claim 1, wherein the inner wall formation of the first chamber has a height of at least 18 m.

13. A reactor including:
    first and second chambers, wherein the first chamber is defined by an inner wall formation and the second chamber is entirely or at least in part defined by spacing between the inner wall formation and an outer wall formation arranged about or around the inner wall formation and said inner and outer walls are constructed from concrete or structural ceramics;
    wherein the first chamber includes an upper inlet supplying a liquid absorbent rich in carbon dioxide to an upper section of the first chamber, an upper outlet discharging gas phase highly concentrated in carbon dioxide from the first chamber, a lower outlet discharging the liquid absorbent lean in carbon dioxide from a lower region of the first chamber;
    wherein the second chamber includes an upper inlet supplying liquid absorbent lean in carbon dioxide to an upper section of the second chamber, the upper inlet being flow connected to the lower outlet of the first chamber, a lower inlet supplying gas phase rich in carbon dioxide to a lower section of the second chamber, a lower outlet discharging liquid absorbent that is rich in carbon dioxide from the second chamber and is flow connected to the upper inlet of the first chamber, and an outlet discharging a stream of gas lean in carbon dioxide;
    wherein the inner and outer walls are constructed by assembling falsework that form boundaries defining the inner and outer walls, and concrete or structural ceramics is poured into the falsework to form the wall; and
    wherein the first chamber protrudes from the lower section of the second chamber and tubes of a heater pass directly into the lower section of the first chamber.

14. A reactor including:
    first and second chambers, wherein the first chamber is defined by an inner wall formation and the second chamber is entirely or at least in part defined by spacing between the inner wall formation and an outer wall formation arranged about or around the inner wall formation, said inner and outer walls are constructed from concrete or structural ceramics;

wherein the first chamber includes an upper inlet supplying a liquid absorbent rich in carbon dioxide to an upper section of the first chamber, an upper outlet discharging gas phase highly concentrated in carbon dioxide from the first chamber, a lower outlet discharging the liquid absorbent lean in carbon dioxide from a lower region of the first chamber;

wherein the second chamber includes an upper inlet supplying liquid absorbent lean in carbon dioxide to an upper section of the second chamber, the upper inlet being flow connected to the lower outlet of the first chamber, a lower inlet supplying gas phase rich in carbon dioxide to a lower section of the second chamber, a lower outlet discharging liquid absorbent that is rich in carbon dioxide from the second chamber and is flow connected to the upper inlet of the first chamber, and an outlet discharging a stream of gas lean in carbon dioxide; and wherein the inner and outer walls are constructed by assembling falsework that form boundaries defining the inner and outer walls, and concrete or structural ceramics is poured into the falsework to form the wall, and wherein the lower section of the first chamber is contained within the second chamber and tubes of a heater pass into the lower section of the first chamber via the second chamber.

\* \* \* \* \*